United States Patent
Zimmerman

(10) Patent No.: US 9,631,340 B2
(45) Date of Patent: Apr. 25, 2017

(54) TOPSOIL SEPARATOR AND SPREADER FOR SKID STEER LOADERS

(71) Applicant: Philip M. Zimmerman, Ephrata, PA (US)

(72) Inventor: Philip M. Zimmerman, Ephrata, PA (US)

(*) Notice: Subject to any disclaimer, the term of this patent is extended or adjusted under 35 U.S.C. 154(b) by 184 days.

(21) Appl. No.: 14/641,771

(22) Filed: Mar. 9, 2015

(65) Prior Publication Data

US 2015/0259876 A1    Sep. 17, 2015

Related U.S. Application Data

(60) Provisional application No. 61/954,528, filed on Mar. 17, 2014.

(51) Int. Cl.
| | |
|---|---|
| *E02F 3/96* | (2006.01) |
| *E02F 3/407* | (2006.01) |
| *E02F 7/06* | (2006.01) |
| *A01B 33/02* | (2006.01) |
| *A01B 35/28* | (2006.01) |
| *A01B 37/00* | (2006.01) |

(52) U.S. Cl.
CPC ............ *E02F 3/962* (2013.01); *A01B 33/024* (2013.01); *E02F 3/407* (2013.01); *E02F 7/06* (2013.01); *A01B 35/28* (2013.01); *A01B 37/00* (2013.01)

(58) Field of Classification Search
CPC ....... A01B 43/00; A01B 35/14; A01B 33/021; A01B 77/00; A01B 33/024; A01B 35/28; A01B 37/00; B07B 1/10; B07B 1/469; B65G 27/04; E02F 5/226; E02F 3/34; E02F 3/407; E02F 3/401; E02F 7/06; E02F 3/962

USPC .......... 37/403–410, 468, 142.5; 171/63, 105, 171/135, 13, 15, 136, 144, 97; 172/40, 172/32, 118, 554; 198/750.1; 209/261, 209/309, 325, 643, 260, 421; 414/722–724

See application file for complete search history.

(56) References Cited

U.S. PATENT DOCUMENTS

| | | | | |
|---|---|---|---|---|
| 2,630,051 A | * | 3/1953 | Clarence ............... | A01B 43/00 171/113 |
| 3,765,490 A | * | 10/1973 | Logue ..................... | E02F 7/06 171/132 |
| 4,005,755 A | * | 2/1977 | Bakke .................... | A01B 43/00 171/13 |

(Continued)

*Primary Examiner* — Robert Pezzuto
(74) *Attorney, Agent, or Firm* — Miller Law Group, PLLC

(57) ABSTRACT

A topsoil separating and spreading apparatus includes a grate and rotor assembly that can be pivotally mounted on the top of a standard loader bucket for operation. The spreader member includes an arcuate grate formed with slotted openings and a rotor rotatably mounted concentrically with the arcuate grate so that disks mounted on the rotor shaft will move adjacent to the arcuate grate to push topsoil through the grate openings. The spreader member is pivotally movable between opened and closed positions and is powered by the prime mover. The opening of the spreader member allows a supply of topsoil to be loaded into the bucket loader, after which the spreader member can be closed against the bucket to force topsoil to be discharged therefrom through the grate openings. The rotor breaks up clumps within the bucket, while the grate prevents the discharge of non-frangible debris from the supply of topsoil.

19 Claims, 11 Drawing Sheets

(56) References Cited

U.S. PATENT DOCUMENTS

| | | | |
|---|---|---|---|
| 4,364,434 A | 12/1982 | Erholm | |
| 4,839,035 A | 6/1989 | Iafrate | |
| 5,060,732 A | 10/1991 | Baskett | |
| 5,564,506 A | 10/1996 | Foster | |
| 5,682,953 A | 11/1997 | Buysse | |
| 6,092,607 A * | 7/2000 | Bercheny | A01B 43/00 171/132 |
| 6,375,012 B1 * | 4/2002 | Leyland | E02F 3/407 209/393 |
| 6,705,552 B2 | 3/2004 | Ellsaesser | |
| 6,725,942 B2 * | 4/2004 | Stevens | A01B 77/00 172/118 |
| 7,117,951 B2 * | 10/2006 | Stevens | A01B 35/14 171/105 |
| 7,841,422 B1 | 11/2010 | Chavez | |
| 9,169,618 B1 * | 10/2015 | Brown | F16L 1/028 |

* cited by examiner

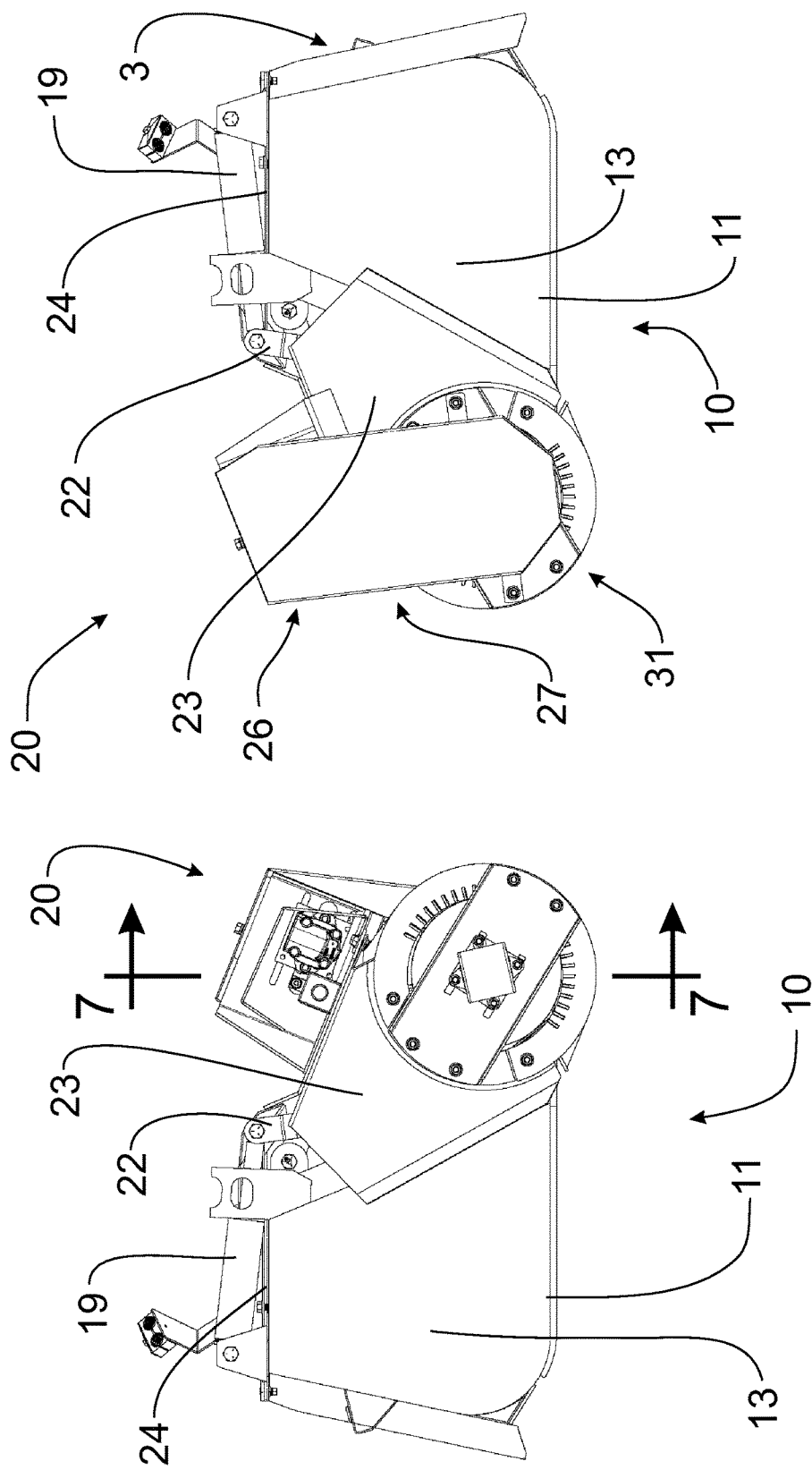

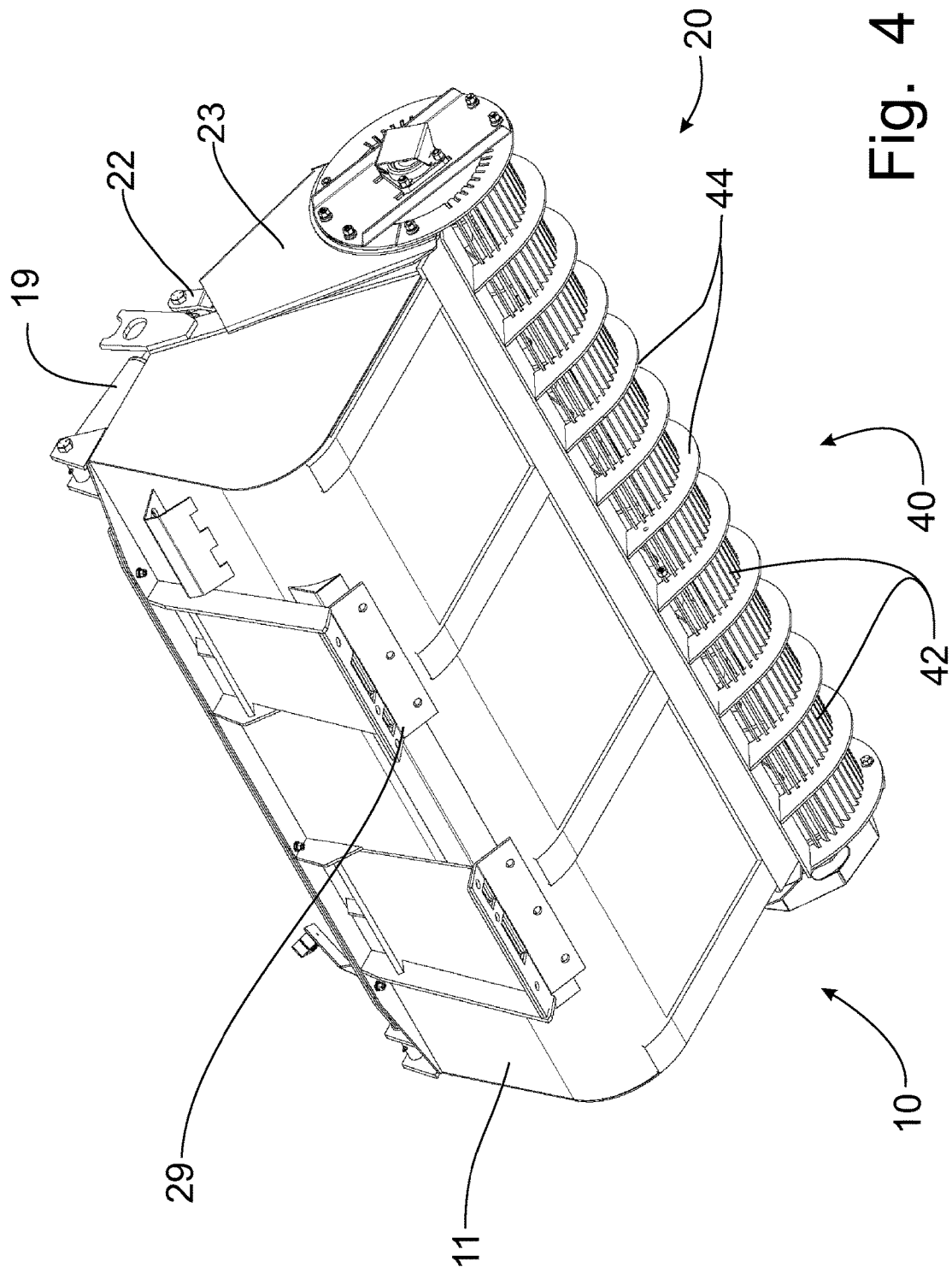

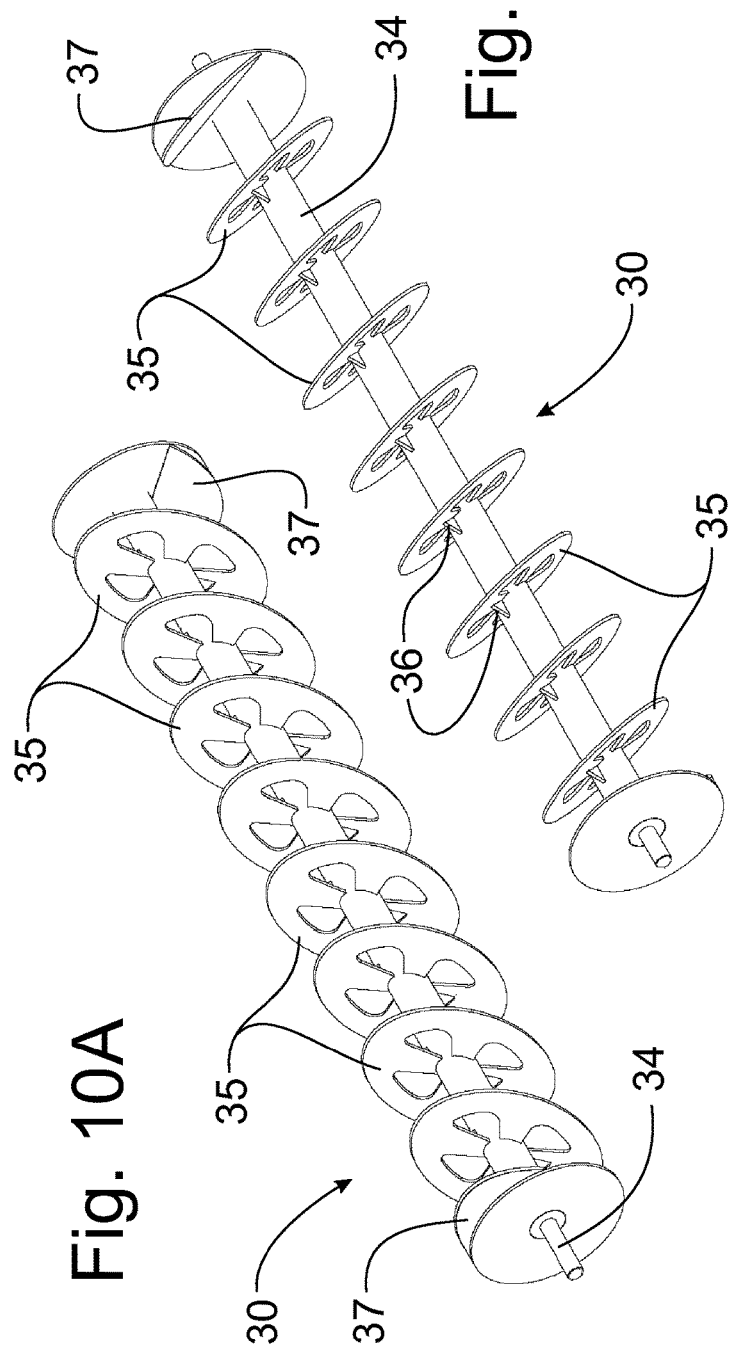
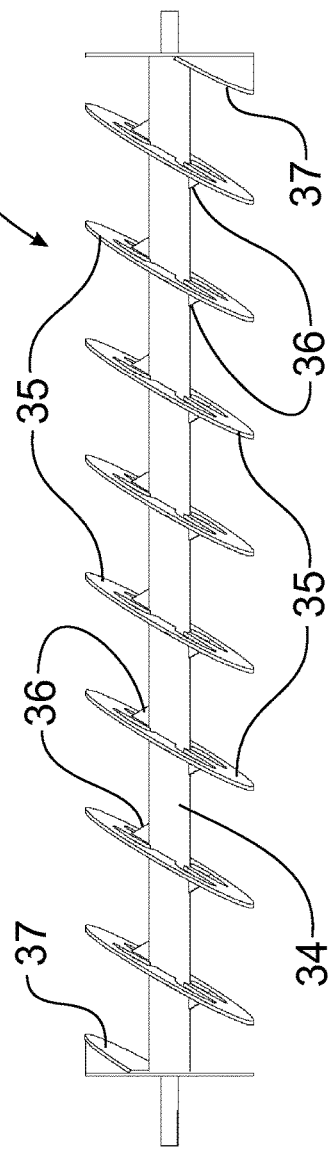

TOPSOIL SEPARATOR AND SPREADER FOR SKID STEER LOADERS

CROSS-REFERENCE TO RELATED APPLICATIONS

This application claims domestic priority from U.S. Provisional Patent Application Ser. No. 61/954,528, filed on Mar. 17, 2014, the content of which is incorporated herein by reference.

FIELD OF THE INVENTION

This invention relates generally to attachments for skid steer loaders, and other loaders having hydraulic power available, and more particularly, to a topsoil separating and spreading apparatus cooperable with a loader bucket for disintegrating and spreading topsoil from the bucket.

BACKGROUND OF THE INVENTION

Skid steer loaders are well knows ground working machines that have hydraulically driven wheels that are fixed for rotation relative to the frame of the machine. Steering is accomplished by controlling the rotation of the wheels on opposite sides of the machine such that a differential in rotational speeds will result in a turning of the machine. The skid steer loader has a centrally positioned operator compartment mounted on the frame with an engine typically located behind the operator. A pair of boom arms is pivotally supported on the frame for vertical movement on opposite sides of the operator compartment. These boom arms are connected together forwardly of the operator compartment with an attachment plate through which various attachments can be mounted to the boom arms.

Skid steer loaders are manufactured in many sizes for use in a variety of operations from cleaning chicken houses to moving materials from one location to another. Because of the versatility of skid steer loaders many attachments have been devised for mounting on the boom arms forwardly of the operator to accomplish the desired operation for the skid steer loader. One simple such attachment is a loader bucket that has a mechanism along the rearward wall to permit connection with the attachment plate and is then operable to scoop materials, such as stone and soil, with the forward movement of the machine and to elevate those materials by vertically moving the boom arms. Hydraulic cylinders controllable by the operator allow the bucket to rotate about a pivot axis to tip the bucket in order for the materials to spill out of the bucket.

Other attachment devices have been created to perform many specialized tasks. One such attachment device is a rock raking apparatus such as is disclosed in U.S. Pat. No. 5,564,506, granted to Phillip Foster, et al on Oct. 15, 1996. This rock raking apparatus includes a loader bucket on which is mounted a pivotally movable rock rake having a toothed rotor that is powered through the hydraulics of the skid steer loader to sweep rocks and other debris into the bucket as the rock rake is moved along the surface of the ground. When the bucket is filled with collected rocks and other debris, the skid steer loader moves to a location for disposal of the debris, whereupon the rock rake is pivoted by hydraulic cylinders away from the front edge of the bucket so that the bucket can be tipped and allow the collected rocks and debris to be emptied from the bucket. The hydraulic cylinders can subsequently be extended to reposition the rock rake in front of the bucket for further operation.

A similar ground-raking and rock gathering attachment device is disclosed in U.S. Pat. No. 4,364,434 granted to Gary Erholm on Dec. 21, 1982. Like the rock raking apparatus of U.S. Pat. No. 5,564,506, this rock gathering attachment has a rock gathering member pivotally mounted to a loader bucket wherein the rock gathering member has a rotatable raking apron that rakes the ground to move rocks and debris rearwardly into the loader bucket. Once filled, the loader is moved to a dump site where the bucket is elevated and then tipped. A connection linkage retains the rock gathering member in a generally horizontal orientation as the bucket is tipped so that the front edge of the bucket and the rock gathering member separate to allow the discharge of the collected debris from the bucket.

Yet another ground raking attachment device is disclosed in U.S. Pat. No. 5,060,732, issued on Oct. 29, 1991, to Theodore Baskett. Similar to the rock raking attachment of U.S. Pat. No. 5,564,506, the loader bucket has a ground raking member pivotally mounted to the bucket so that hydraulic cylinders can rotate the ground raking member away from the front edge of the bucket for discharge of the collected debris from the bucket. This ground raking member also includes a rotatable cylinder formed with a plurality of teeth that rake through the top surface of the ground to collect material rearwardly into the bucket. The rotation of the toothed cylinder is powered by a hydraulic motor carried on the ground raking member and powered from the hydraulic system on the skid steer loader.

A reel-type of rock gathering attachment is disclosed in U.S. Pat. No. 5,682,953, issued to Dale Buysse on Nov. 4, 1997. Similar to the aforementioned rock gathering attachments, the reel is rotatably supported on a pivotally mounted frame that is movable through the extension of hydraulic cylinders to separate the frame from the front edge of the bucket for discharge of collected debris. The bucket of this rock gathering attachment is formed with as a grate along the bottom surface thereof to allow smaller particles of material to fall through the grate while retaining the larger debris within the bucket. Such an apparatus would be particularly adaptable to gathering debris off a sandy beach such that the debris would be retained within the bucket while the sand would be allowed to fall back to the beach.

Soil separators are also known. One such soil separator is disclosed in U.S. Pat. No. 4,839,035, granted on Jun. 13, 1989, to John Iafrate, in which the ungraded soil is loaded into a hopper from which the ungraded soil is discharged into a cylindrical rotor formed with spirally mounted bladed that sweep the ungraded soil against a screen while conveying the unscreened soil to the end of the rotor. Soil passing through the screen is collected and removed from the separating apparatus. The remaining material is discharged from the cylindrical rotor onto a conveyor to be disposed remotely from the separating apparatus.

The soil separating system in U.S. Pat. No. 7,841,422, granted to Joseph Chavez, et al on Nov. 30, 2010, is a mobile apparatus having a front edge that engages the surface of the soil with an elevated conveyor that overrides the sloped floor of the apparatus to move soil, including rocks and other debris, rearwardly toward a collecting bin. The sloped floor includes a stationary screen through which the topsoil particles would pass to return to the ground while the overriding conveyor moves rocks and debris having a size too great to pass through the screen rearwardly into the collection bin.

A push-type compost spreader is shown in U.S. Pat. No. 6,705,552, issued to T. Daniel Ellsaesser on Mar. 16, 2004, in which a small rotor is rotatably supported at the bottom of a hopper to agitate the compost within the hopper to prevent bridging and to break up the compose for discharge through the discharge opening at the bottom of the hopper. The rotor is preferably driven through a ground-drive mechanism, but is formed with axially spaced disks mounted on a rotatable shaft at a canted angle to the axis of the rotor. As a result, the rotation of the rotor provides an undulating action due to the canted mounting of the disks to agitate the compost material funneling down to the bottom of the hopper.

It would be desirable to provide a topsoil spreading attachment device for use with a skid steer loader to enhance the spreading and separating of topsoil being discharge therefrom to the surface of the ground.

SUMMARY OF THE INVENTION

It is an object of this invention to overcome the disadvantages of the prior art by providing a topsoil spreading apparatus for use with a skid steer loader.

It is another object of this invention to provide a topsoil spreader that mounts on the boom of a loader, such as a skid steer loader, to separate and spread topsoil from the apparatus.

It is a feature of this invention that the topsoil spreader apparatus includes a grate pivotally supported on a loader bucket for movement between opened and closed positions.

It is another feature of this invention that the topsoil spreader member includes an agitating rotor rotatably mounted on the grate so as to be concentric with the grate and movable in association with the grate.

It is an advantage of this invention that the grate and rotor are pivotally movable on the loader bucket to permit the loader bucket to scoop a supply of topsoil into the loader bucket before the grate and rotor are moved into the closed position.

It is another advantage that the grate and rotor form an assembly that can be pivotally mounted on a standard loader bucket.

It is still another feature of this invention that the agitating rotor is rotatably powered through operable connection with a hydraulic motor.

It is still another object of this invention to separate topsoil from debris that is included with a stockpile of topsoil and then pass the separated topsoil through the grate to the ground.

It is another feature of this invention that the grate is configured in a manner that the grate openings are the lowermost part of the apparatus when the loader bucket is tipped to dump the material out of the loader bucket and when the grate and rotor assembly are moved into a closed position against the bucket loader.

It is another advantage of this invention that the rotor is formed with disks that move when the rotor is rotated against the grate to break up clumps of topsoil and to move the topsoil within the loader bucket through the grate openings.

It is yet another feature of this invention that the debris retained inside the loader bucket, because the debris cannot pass through the openings of the grate closed against the loader bucket, can be dumped at a remote location by moving the grate and rotor assembly to an opened position and tipping the loader bucket to dump material out of the bucket.

It is yet another advantage of this invention that the movement of the grate and rotor assembly and the rotation of the rotor can be powered from the hydraulic system of the prime mover on which the loader bucket is mounted.

It is a further object of this invention to provide a topsoil separating and spreading apparatus for mounting on a loader bucket which is durable in construction, inexpensive of manufacture, carefree of maintenance, facile in assemblage, and simple and effective in use.

These and other objects, features and advantages are accomplished according to the instant invention by providing a topsoil separating and spreading apparatus that includes a grate and rotor assembly that can be pivotally mounted on the top of a standard loader bucket for operation. The spreader member includes an arcuate grate formed with slotted openings and a rotor rotatably mounted concentrically with the arcuate grate so that disks mounted on the rotor shaft will move adjacent to the arcuate grate to push topsoil through the grate openings. The spreader member is pivotally movable between opened and closed positions and is powered by the prime mover. The opening of the spreader member allows a supply of topsoil to be loaded into the bucket loader, after which the spreader member can be closed against the bucket to force topsoil to be discharged therefrom through the grate openings. The rotor breaks up clumps within the bucket, while the grate prevents the discharge of non-frangible debris from the supply of topsoil.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a right side elevational view of the topsoil separating and spreading apparatus as shown in FIG. 1;

FIG. 3 is a left side elevational view of the topsoil separating and spreading apparatus as shown in FIG. 1;

FIG. 4 is a lower right, rear perspective view of the topsoil separating and spreading apparatus in the configuration depicted in FIG. 1;

FIG. 10A is a perspective view of the rotor showing the discs mounted on the central shaft;

FIG. 10B is a perspective view of the rotor rotated through approximately 180 degrees from the orientation shown in FIG. 10A;

FIG. 10C is a front elevational view of the rotor as depicted in FIG. 10A;

DETAILED DESCRIPTION OF THE PREFERRED EMBODIMENT

Figure 1:
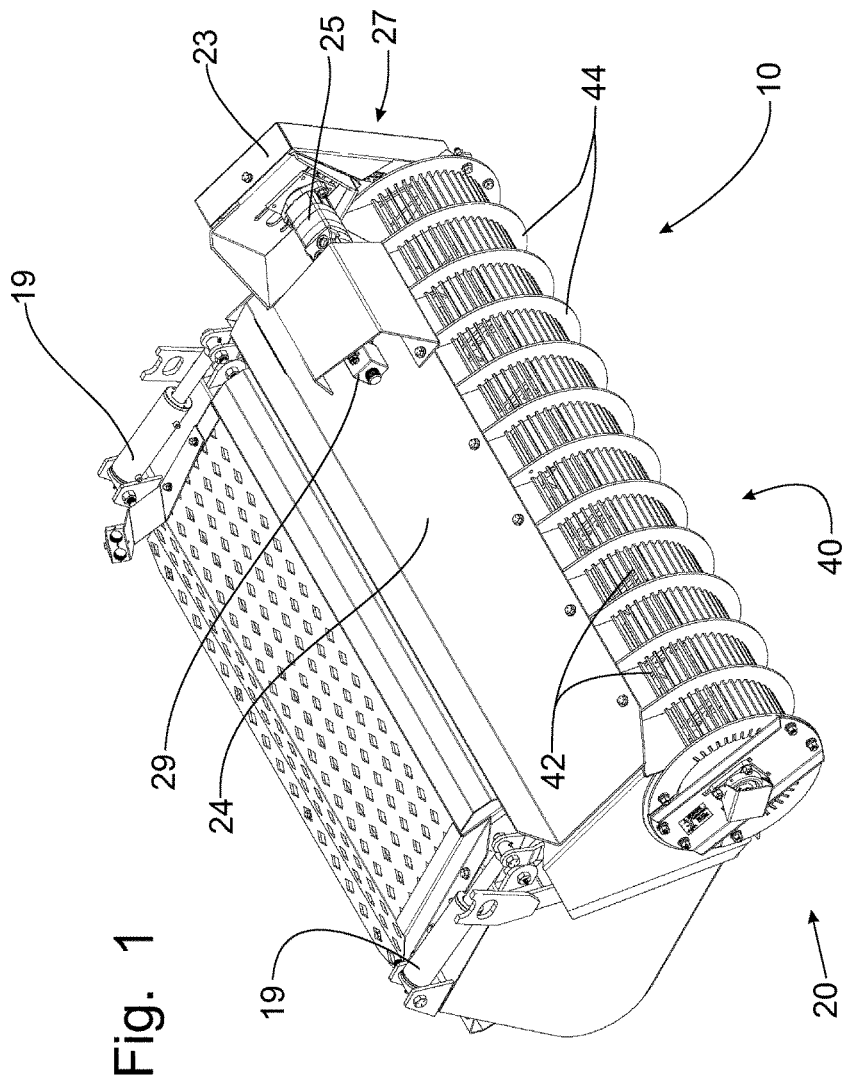
FIG. 1 is an upper right, front perspective view of a topsoil separating and spreading apparatus incorporating the principles of the instant invention, the separating and spreading apparatus being shown in a closed operating position in which the spreader member is lowered against the loader bucket to discharge topsoil through the arcuate grate.
Figure 5:
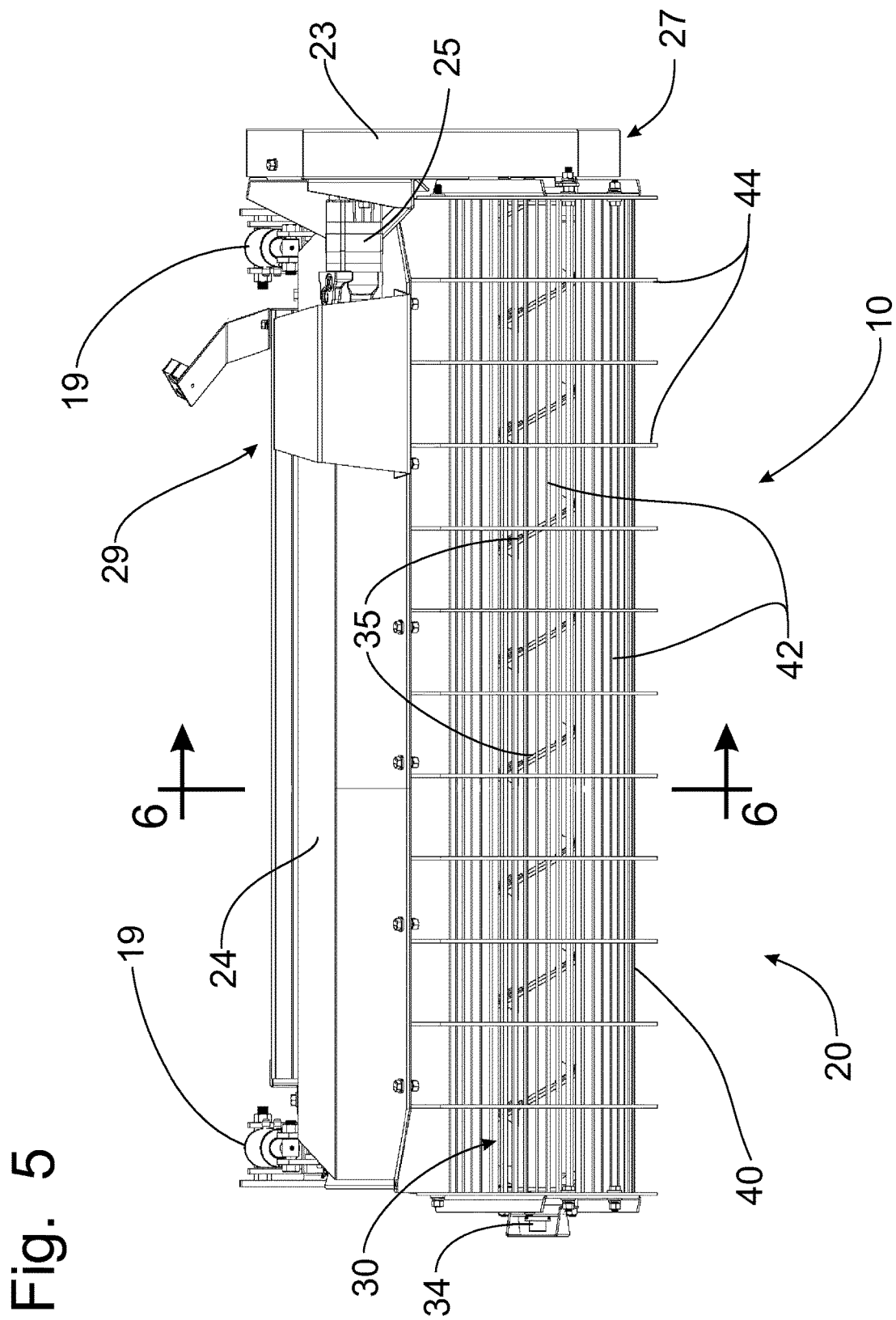
FIG. 5 is a front elevational view of the topsoil separating and spreading apparatus as shown in FIG. 1.
Figure 6:
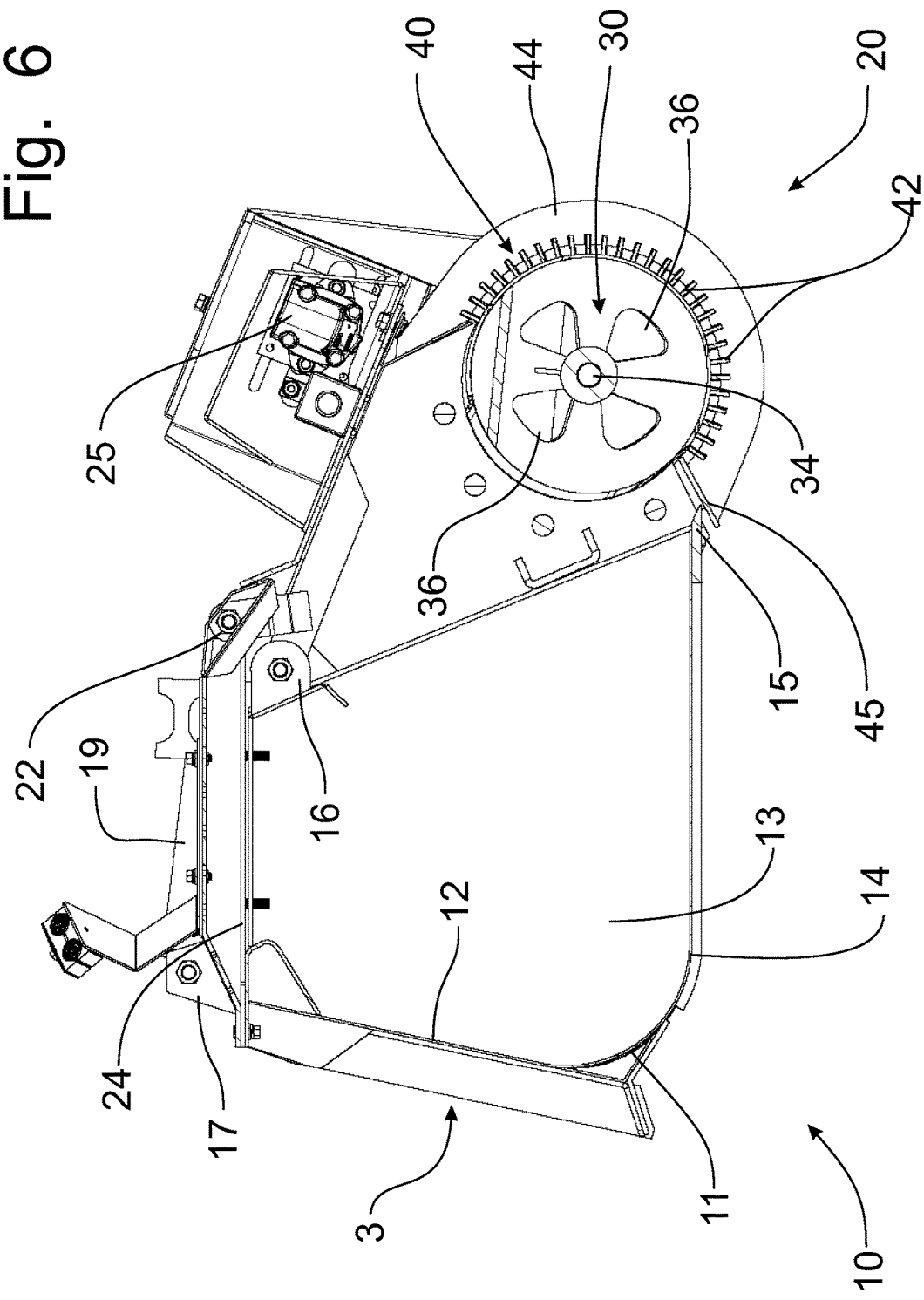
FIG. 6 is a cross-sectional view of the topsoil separating and spreading apparatus taken along lines 6-6 of FIG. 5.
Figure 7:
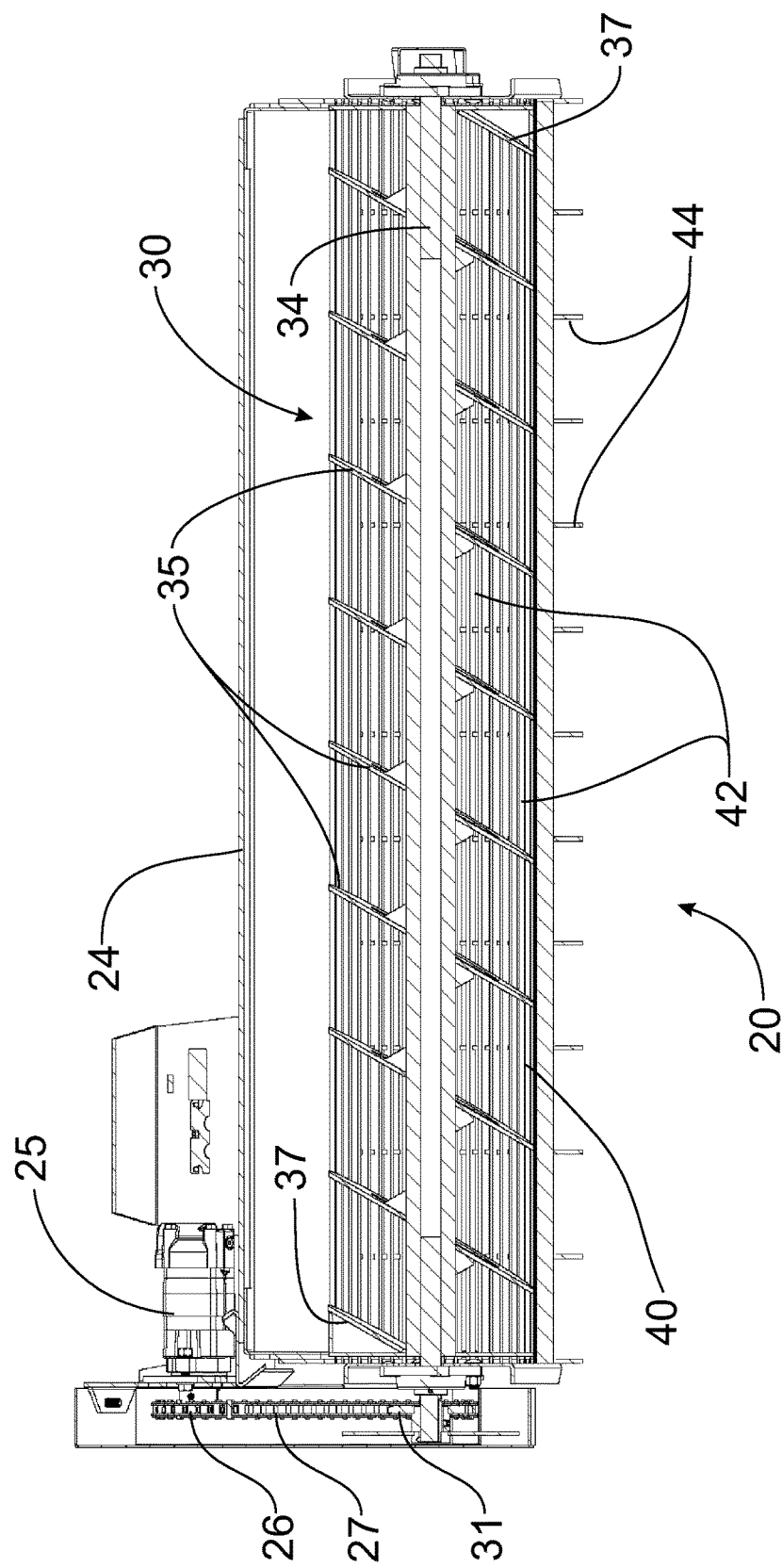
FIG. 7 is a cross-sectional view of the topsoil separating and spreading apparatus taken along the lines 7-7 of FIG. 2.

Referring now to the drawings, the structural components of a topsoil separating and spreading apparatus incorporating the principles of the instant invention can best be seen. Any left and right references are used as a matter of convenience and are determined by standing at the rear of the topsoil separating and spreading apparatus, such as from the orientation from the operator compartment of the skid steer loader, and facing the forward direction, the normal direction of travel of the skid steer loader, with the topsoil separating and spreading apparatus mounted on the forward end of the skid steer loader. One skilled in the art will understand that the principles of the instant invention are not limited to a skid steer loader and that the topsoil separating and spreading apparatus could be mounted onto any loader bucket that is coupled to a prime mover that supplies a source of hydraulic power for connection to the hydraulic cylinders and hydraulic motor, as will be described in greater detail below. However, the preferred embodiment is the mounting of the topsoil separating and spreading apparatus onto a skid steer loader, which is described herein and shown in the drawings.

Figure 11:
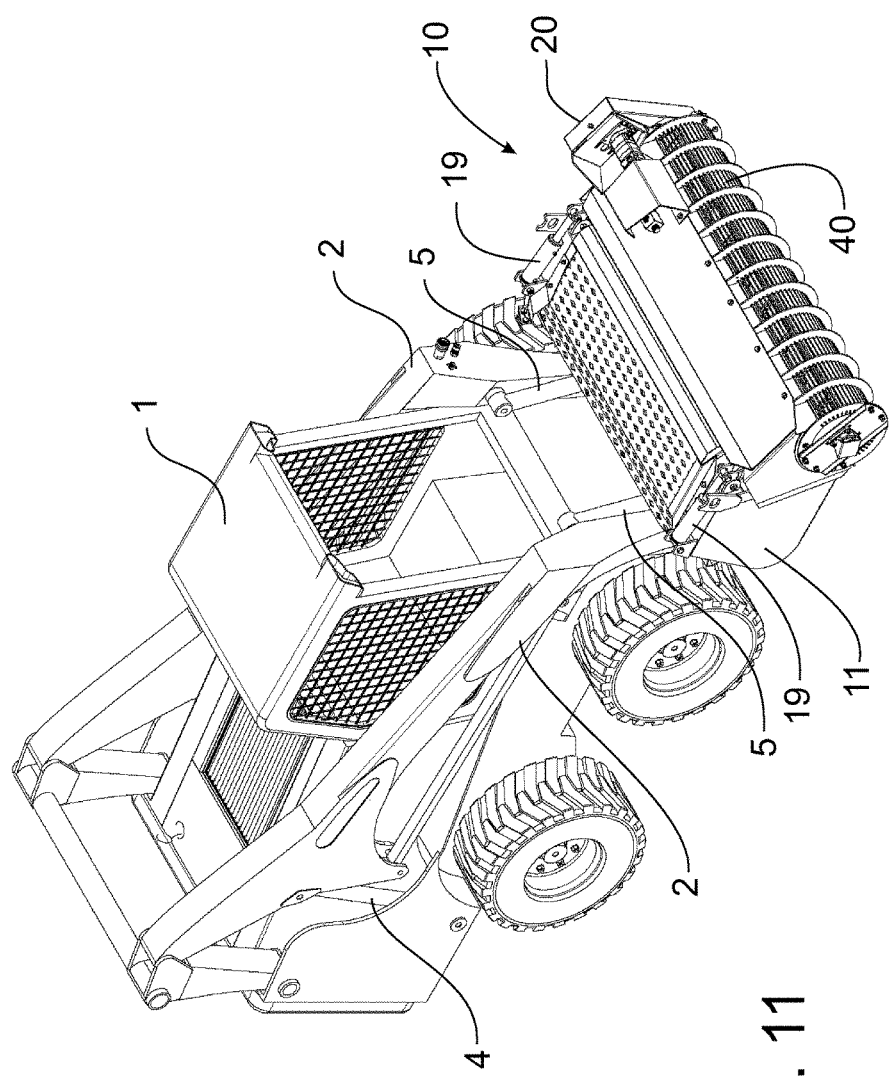
FIG. 11 is an upper right, front perspective view of a skid steer loader having the topsoil separating and spreading apparatus mounted on the mounting plate of the skid steer loader and supported on the skid steer loader boom arms.
Figure 12:
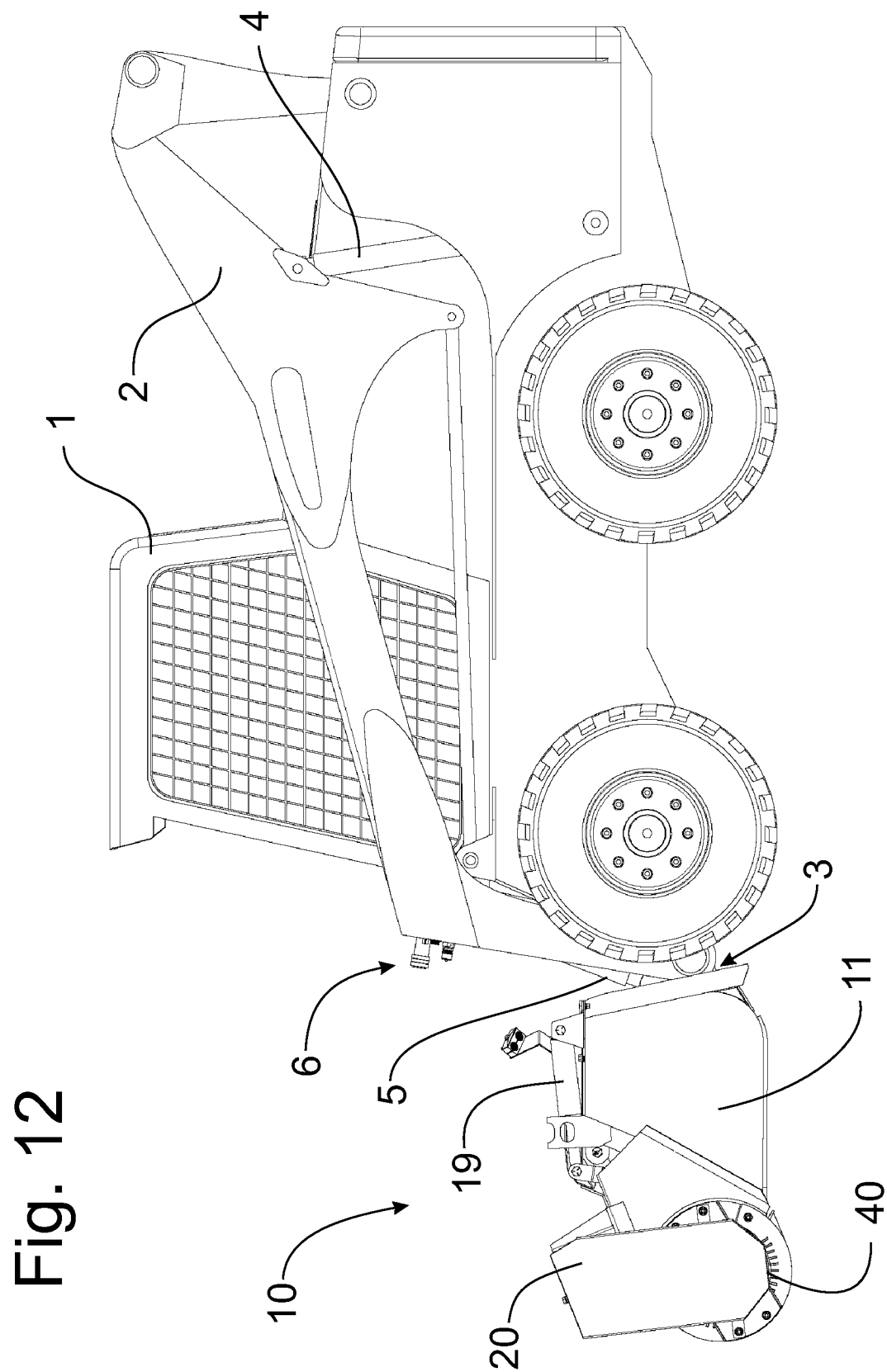
FIG. 12 is a left side elevational view of the skid steer loader and topsoil separating and spreading apparatus mounted thereon as depicted in FIG. 11.

As best seen in FIGS. 11 and 12, the skid steer loader 1 is formed with a pair of boom arms 2 that extend to a mounting plate 3 interconnecting the forward ends of the two boom arms 2. The boom arms 2 are vertically movable through manipulation of the first hydraulic cylinders 4 that are anchored on the frame of the skid steer loader 1 and attached to the respective boom arms 2. A second pair of hydraulic cylinders 5 interconnects the boom arms and the mounting plate 3 to power the tipping movement of the mounting plate 3 and anything attached thereto. The skid steer loader 1 has at least two hydraulic ports 6 that detachably connect hydraulic hoses for the connection of attachments to the mounting plate 3 that need auxiliary hydraulic power for operation. More typically, the skid steer loader 1 will have several auxiliary hydraulic ports 6.

As best seen in FIGS. 1-10, the topsoil separating and spreading apparatus 10 has as a base member a loader bucket 11 formed with a back wall 12, opposing side walls 13 and a floor 14 terminating in a front edge 15. The back wall 12 is provided with a conventional mounting mechanism (not shown) on the rearward side of the back wall 12 that is cooperable with the mounting plate 3 on the skid steer loader 1 in a known manner. The loader bucket 11 establishes a cavity between the floor 14, the side walls 13 and the back wall 12 in which a supply of material, such as topsoil, can be loaded. A pair of opposing mounting arms 16 is affixed to the side walls 13 of the loader bucket 11 to pivotally support a spreader member 20.

Figure 8:
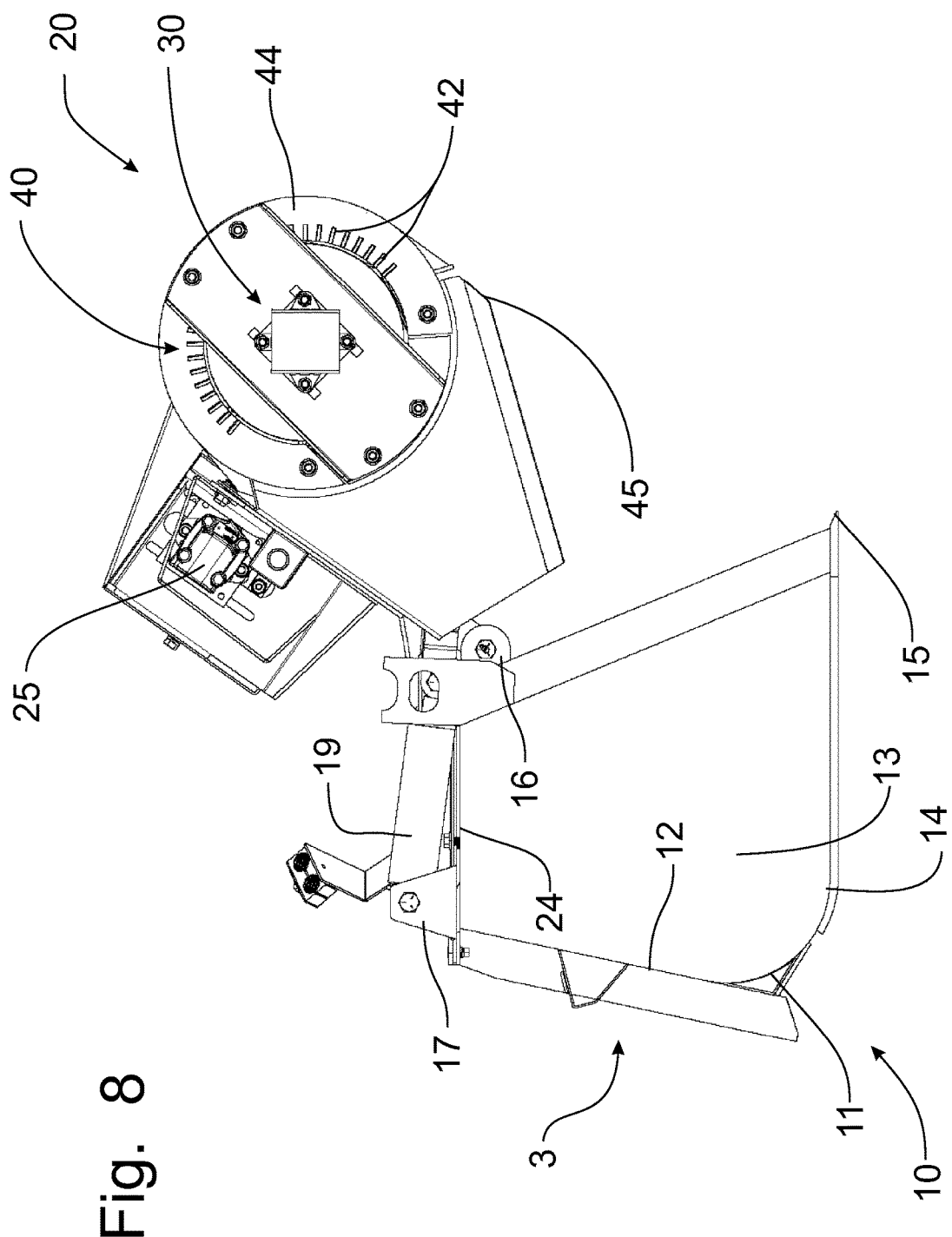
FIG. 8 is a right side elevational view of the topsoil separating and spreading apparatus with the spreader member being pivotally moved to an opened position to expose the loader bucket to permit the loader bucket to be utilized to scoop a supply of topsoil to be run through the separating and spreading apparatus.
Figure 9:
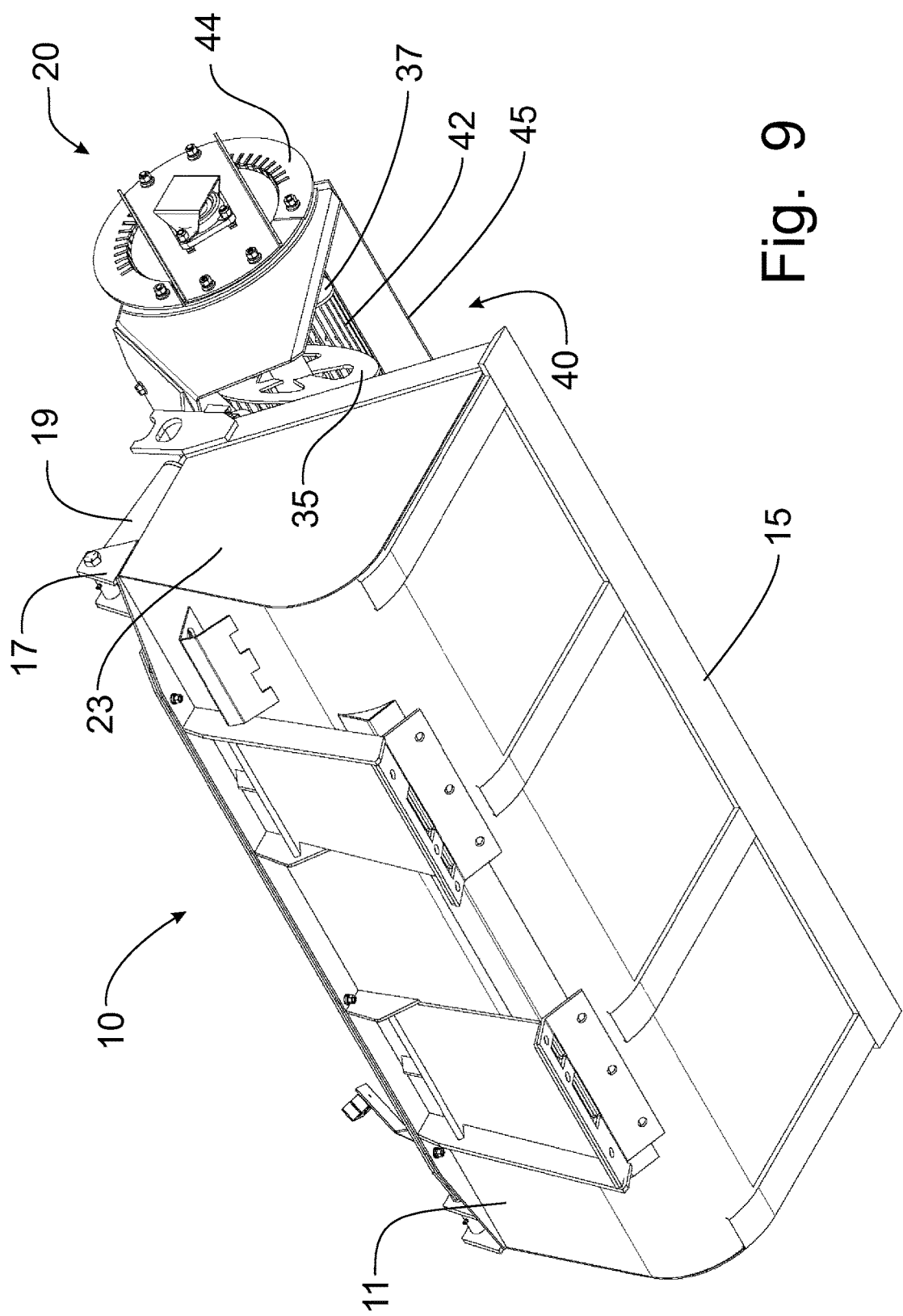
FIG. 9 is a lower right, rear perspective view of the topsoil separating and spreading apparatus in the opened configuration depicted in FIG. 8.

The spreader member 20 is pivotally connected to the mounting arms 16 for movement between a raised, open inoperative position depicted in FIGS. 8 and 9 and a lowered, closed operative position depicted in FIGS. 1-7. The spreader member 20 includes a pivot link 22 projecting upward from the pivotal connection to each of the mounting arms 16. A pair of brackets 17 is mounted along the top portion of the back wall 12 to anchor a corresponding pair of hydraulic cylinders 19 to power the pivotal movement of the spreader member 20 relative to the loader bucket 11.

The spreader member 20 is preferably formed with a pair of opposing side members 23 and a top member 24 extending between the side members 23. At the forward end of the side members, a rotor 30 is mounted for rotation about a transversely extending axis of rotation. The left side member 23 supports a hydraulic motor 25 that is powered from the auxiliary hydraulic system from the skid steer loader 1, as will be described in greater detail below. A drive sprocket 26 driven by the hydraulic motor 25 is connected to a driven sprocket 31 mounted to the rotor by an endless chain 27 to transfer rotational power from the hydraulic motor 25 to the rotor 30.

The forward portion of the spreader member 20 is formed across the entire transverse width of the spreader member 20 with an arcuate grate 40 that is concentric with the axis of rotation of the rotor 30. The arcuate grate 40 is formed from a plurality of spaced apart steel bars 42 oriented transversely and supported by arcuate support rings 44 that are spaced along the transverse width of the arcuate grate 40. The lower edge 45 of the arcuate grate 40 is configured and oriented to mate against the front edge 15 of the loader bucket 11 when the spreader member 20 is lowered to the operative position. Thus, when the spreader member 20 is lowered into the operative position, the cavity formed in the loader bucket 11 is closed along the front thereof by the lowered spreader member 20.

The rotor 30 is formed with a central shaft 34 corresponding to the axis of rotation and is rotatably supported on each opposing side member 23. A plurality of disks 35 are mounted on the central shaft 34 at spaced apart intervals and are positioned to be in close proximity to the arcuate grate 40. Each disc 35 is mounted at an angle of inclination relative to the axis of rotation and is supported in that inclination angle by braces 36 affixed to the central shaft 34. As a result, the rotation of the central shaft 34 will sweep the peripheral edge of the disks 35 across the surface of the arcuate grate 40 is an oscillating manner. The spacing of the disks 35 is such that the angle of inclination positions the oscillating paths of movement of adjacent disks 35 in adjacent proximity, or even in a slightly overlapping relationship. The oscillating paths of movement of the disks 35 will cover the entire interior surface of arcuate grate. Preferably, the respective ends of the rotor 30 are provided with an end member 37 that is affixed to the central shaft 34 to be rotatable therewith. The rotating end members 37 on the respective transverse ends of the rotor 30 prevent the build-up of dirt against the sides of the loader bucket 11 that would have a power-robbing effect on the operation of the rotor 30.

Since the operation of the hydraulic motor 25 is not needed when the spreader member 20 is raised into the inoperative position, and since the hydraulic cylinders 19 need only to be powered when lifting the spreader member from the lowered inoperative position to the raised inoperative position, the hydraulic cylinders 19 and the hydraulic motor 25 can be powered from different pairs or from the same pair of auxiliary hydraulic ports 6. To divert the flow of hydraulic fluid between the hydraulic cylinders 19 and the hydraulic motor 25 for the utilization of the same pair of auxiliary hydraulic ports 6, an optional electrically operated hydraulic valve 29 can be provided, which is typically connected to a power receptacle next to the hydraulic ports 6. The hydraulic hoses (not shown) can deliver hydraulic fluid under pressure from the auxiliary ports 6 to the hydraulic valve 29, which is then diverted to either the hydraulic cylinders 19 or the hydraulic motor 25 as directed through the electrically powered spool. Thus, when the spreader member 20 is to be raised into the inoperative position, the spool is shifted to direct fluid flow to the cylinders 19, which results in the hydraulic motor 25 being stopped so that the rotor 30 is not rotating when the spreader member 20 is being raised.

The primary use of the separating and spreading apparatus 10 is to separate topsoil from larger debris, such as organic material or rocks, that is typically found in supplies of topsoil. In operation, the spreader member 20 is raised into the inoperative position by operation the hydraulic cylinders 19 to pivot the spreader member 20 about the pivot supports carried on the mounting arms 16. The loader bucket 11 is then driven into a pile of topsoil filling the cavity defined by the floor 14, side walls 13 and back wall 12. The hydraulic cylinders 19 are then operated to pivot the spreader member 20 downward against the loader bucket 11 to close off the cavity and trapping the collected topsoil within the loader bucket 11. The hydraulic cylinders 4, 5 are then actuated to raise the boom arms 2 and to tilt forwardly the mounting plate 3, re-orienting the topsoil spreading apparatus 10 in a manner that positions the arcuate grate 40 closer to the ground than the back wall 12 of the loader bucket 11.

The spool on the hydraulic valve 29 is shifted to direct the flow of hydraulic fluid to the hydraulic motor 25 and cause rotor 30 to rotate and sweep the angled disks 35 along the arcuate grate 40. Much of the topsoil will pass through the arcuate grate without agitation; however, some of the topsoil can be clumped together and not pass through the spaces between the steel bars 42 in the arcuate grate 40. The agitating, sweeping action of the angled disks 35 breaks up any clumps of topsoil and any other frangible material within the topsoil loaded into the loader bucket 11, thereby discharging the supply of topsoil from the cavity of the loader bucket 11 through the arcuate grate 40 on onto the surface of the ground. When the separating and spreading apparatus 10 is utilized merely as a separator, the discharged topsoil is typically deposited into a new pile. However, by moving the skid steer loader 1 as the topsoil is discharged from the topsoil separating and spreading apparatus 10, the topsoil can be spread into a reasonably uniform pattern over the surface of the ground as the topsoil is separated from the non-frangible foreign matter than might be present.

Once emptied, the operator manipulates the hydraulic cylinders 4, 5 to reposition the topsoil spreading apparatus 10 into a generally horizontal orientation to re-engage the pile of topsoil to be spread by first raising the spreader member 20 and then driving the loader bucket 11 back into the pile of topsoil to re-load the cavity with a fresh supply of topsoil to be spread. In the event the previous load of topsoil had non-frangible matter that was retained in the loader bucket 11, or in the event a supply of non-frangible matter had accumulated within the loader bucket 11 after multiple loads of topsoil had been processed by the separating and spreading apparatus 10, the operator would move the skid steer loader 1 adjacent to a refuse pile. The topsoil separating and spreading apparatus 10 would be raised and tilted as described above for spreading topsoil therefrom, except that the spool of the hydraulic valve 29 would be shifted to direct hydraulic fluid to the hydraulic cylinders 19 and allow the spreader member 20 to be separated from the loader bucket 11 and, thereby, allow the accumulated non-frangible matter (such as rocks and roots) to be emptied from the loader bucket 11. Once emptied, the loader bucket 11 can be re-oriented through manipulation of the hydraulic cylinders 4, 5 to collect a fresh supply of topsoil to be separated and/or spread as described above.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, one skilled in the art will recognize that the spreader member 20 can be formed separately from the loader bucket 11 and provided to operators of skid steer loaders 1 for mounting on a loader bucket 11 previously purchased with the skid steer loader 1. Accordingly, the spreader member 20 can be shipped independently of a loader bucket 11 for use on any standard loader bucket 11 that can be adapted for the mounting of the spreader member 20. In assembly, the spreader member 20 would be pivotally connected to the standard loader bucket 11 that is already operably powered by the pair of hydraulic cylinders 4, 5 mounted on the boom arms 2. The hydraulic cylinders 19 would be mounted to interconnect the loader bucket 11 and the spreader member 20 to control the pivotal movement of the spreader member between the opened and closed positions. If needed, the hydraulic valve 29 would be connected to the skid steer loader hydraulic system and the outputs therefrom connected to the hydraulic cylinders 29 and the hydraulic motor 25 to permit selective operation thereof, as described above.

Having thus described the invention, what is claimed is:

1. A topsoil separating and spreading assembly mountable on a loader bucket, comprising:
    a spreader member having an arcuate grate member defining an arcuate center corresponding to said grate member and being mounted on said loader bucket to be pivotable relative thereto between an opened position in which the loader bucket can load material therein, and a closed position in which the material within said loader bucket will be passed through openings formed in said grate member;
    a rotor rotatably supported in said spreader member for rotation about an axis concentric with the arcuate center of said grate member, said rotor including a plurality of disks mounted on a rotor shaft that upon rotation of said rotor shaft pass adjacent to the openings in said grate member to force topsoil within said loader bucket to pass through said grate openings, said disks defining a periphery that is located internally of and operable within said arcuate grate member to force topsoil through said grate openings;
    a hydraulic motor mounted on said spreader member to power the rotation of said rotor; and
    hydraulic cylinders operatively connected to said spreader member to power the movement thereof between said opened and closed positions.

2. The topsoil separating and spreading assembly of claim 1 wherein said
    said disks are mounted on said rotor shaft in a spaced apart manner at oblique angles relative to said axis of rotation so that said disks sweep across said grate openings upon rotation of said rotor shaft.

3. The topsoil separating and spreading assembly of claim 2 wherein the spreader member further includes side walls for mounting said rotor, and a top wall interconnecting said side walls.

4. The topsoil separating and spreading assembly of claim 3 wherein said side walls are positionable against said loader bucket when said spreader member is moved into said closed position, said top member completing an enclosure of said spreader member against said loader bucket.

5. The topsoil separating and spreading assembly of claim 1 wherein said hydraulic motor and said hydraulic cylinders are connected to a hydraulic valve that can be switched to provide selective operation either to said hydraulic motor or to said hydraulic cylinders.

6. The topsoil separating and spreading assembly of claim 5 wherein said loader bucket is operatively connected to a second pair of hydraulic cylinders to power pivotal movement of said loader bucket.

7. The topsoil separating and spreading assembly of claim 1 wherein said arcuate grate is positioned at a forward end of said spreader member so as to be oriented as a lowermost portion of said spreader member when said loader bucket is tipped to empty material therefrom.

8. A topsoil separating and spreading apparatus for a prime mover having forwardly extending boom arms and a hydraulic system for powering hydraulic devices, comprising:
    a loader bucket pivotally mounted on said boom arms for movement between a loading orientation and an unloading orientation;
    a spreader member having an arcuate grate member defining an arcuate center corresponding to said grate member and being mounted on said loader bucket to be pivotable relative thereto between an opened position in which the loader bucket can load material therein, and a closed position in which the material within said loader bucket will be passed through openings formed in said grate member;
    a rotor rotatably supported in said spreader member for rotation about an axis concentric with the arcuate center of said grate member, said rotor including disks mounted on a rotor shaft that upon rotation of said rotor shaft pass adjacent to the openings in said grate member to cooperate with said grate member to force topsoil within said loader bucket to pass through said grate openings, said rotor being inoperable to externally of said grate member when said spreader member is in said closed position;
    a hydraulic motor powered through said hydraulic system and being mounted on said spreader member to power the rotation of said rotor;
    first hydraulic cylinders operatively powered through said hydraulic system and being connected to said spreader member to power the movement thereof between said opened and closed positions; and
    second hydraulic cylinders operatively powered through said hydraulic system and interconnecting said boom arms and said loader bucket to power the movement of said loader bucket between said loading and unloading orientations.

9. The topsoil separating and spreading apparatus of claim 8 wherein the spreader member further includes side walls for mounting said rotor, and a top wall interconnecting said side walls.

10. The topsoil separating and spreading apparatus of claim 9 wherein said side walls are positionable against said loader bucket when said spreader member is moved into said closed position, said top member completing an enclosure of said spreader member against said loader bucket.

11. The topsoil separating and spreading apparatus of claim 10 wherein said
    disks are mounted on said rotor shaft in a spaced apart manner at oblique angles relative to said axis of rotation so that said disks sweep across said grate openings upon rotation of said rotor shaft.

12. The topsoil separating and spreading apparatus of claim 11 wherein said hydraulic motor and said first hydraulic cylinders are connected to a hydraulic valve that can be switched to provide selective operation either to said hydraulic motor or to said first hydraulic cylinders.

13. The topsoil separating and spreading apparatus of claim 11 wherein said arcuate grate is positioned at a forward end of said spreader member so as to be oriented as a lowermost portion of said spreader member when said loader bucket is tipped to empty material therefrom.

14. The topsoil separating and spreading apparatus of claim 11 wherein said prime mover is a skid steer loader.

15. A topsoil separating and spreading assembly for mounting on a loader bucket on a skid steer loader having forwardly extending boom arms and a hydraulic system, comprising:
    a spreader member having an arcuate grate member defining an arcuate center corresponding to said grate member and being mounted on said loader bucket to be pivotable relative thereto between an opened position in which the loader bucket can load material therein, and a closed position in which the material within said loader bucket will be passed through openings formed in said grate member; and
    a rotor rotatably supported in said spreader member for rotation about an axis concentric with the arcuate center of said grate member, said rotor including disks mounted on a rotor shaft in a spaced apart manner at oblique angles relative to said axis of rotation so that said disks sweep across said grate member so that upon rotation of said rotor shaft said disks pass adjacent to the openings in said grate member to force topsoil within said loader bucket to pass through said grate openings.

16. The topsoil separating and spreading assembly of claim 15 wherein the spreader member further includes side walls for mounting said rotor, and a top wall interconnecting said side walls, said side walls being positionable against said loader bucket when said spreader member is moved into said closed position, said top member completing an enclosure of said spreader member against said loader bucket.

17. The topsoil separating and spreading assembly of claim 15 further comprising:
    a hydraulic motor mounted on said spreader member to power the rotation of said rotor; and
    a pair of hydraulic cylinders operatively connected to said spreader member to power the movement thereof between said opened and closed positions.

18. The topsoil separating and spreading assembly of claim 17 wherein said hydraulic motor and said hydraulic cylinders are connected to a hydraulic valve that can be switched to provide selective operation either to said hydraulic motor or to said hydraulic cylinders.

19. The topsoil separating and spreading assembly of claim 15 wherein said arcuate grate is positioned at a forward end of said spreader member so as to be oriented as a lowermost portion of said spreader member when said loader bucket is tipped to empty material therefrom.

\* \* \* \* \*